US010569967B2

(12) United States Patent
Rolfes

(10) Patent No.: US 10,569,967 B2
(45) Date of Patent: Feb. 25, 2020

(54) INTEGRATED CONTROL SYSTEMS AND METHODS

(71) Applicant: Mark Rolfes, South Bend, IN (US)

(72) Inventor: Mark Rolfes, South Bend, IN (US)

( * ) Notice: Subject to any disclaimer, the term of this patent is extended or adjusted under 35 U.S.C. 154(b) by 0 days.

(21) Appl. No.: 15/840,416

(22) Filed: Dec. 13, 2017

(65) Prior Publication Data

US 2018/0162652 A1 Jun. 14, 2018

Related U.S. Application Data

(60) Provisional application No. 62/433,399, filed on Dec. 13, 2016.

(51) Int. Cl.
*B65G 43/10* (2006.01)
*G05B 19/05* (2006.01)
*G05B 19/418* (2006.01)

(52) U.S. Cl.
CPC ........... *B65G 43/10* (2013.01); *G05B 19/056* (2013.01); *G05B 19/4189* (2013.01); *G05B 2219/2621* (2013.01)

(58) Field of Classification Search
CPC combination set(s) only.
See application file for complete search history.

(56) References Cited

U.S. PATENT DOCUMENTS

| | | | |
|---|---|---|---|
| 5,247,650 A * | 9/1993 | Judd | G05B 19/4097 703/20 |
| 5,812,394 A | 9/1998 | Lewis et al. | |
| 5,838,563 A | 11/1998 | Dove et al. | |
| 6,411,987 B1 | 6/2002 | Steger et al. | |
| 6,701,214 B1 * | 3/2004 | Wielebski | B65G 37/02 198/460.1 |
| 6,799,080 B1 | 9/2004 | Hylden et al. | |
| 6,868,538 B1 | 3/2005 | Nixon et al. | |
| 7,730,498 B2 | 6/2010 | Resnick et al. | |
| 2002/0010527 A1 * | 1/2002 | Wielebski | B65G 37/02 700/230 |
| 2004/0260404 A1 | 12/2004 | Russell et al. | |
| 2007/0088533 A1 * | 4/2007 | Serizawa | G05B 19/41885 703/6 |
| 2008/0127065 A1 | 5/2008 | Bryant et al. | |
| 2014/0229226 A1 * | 8/2014 | Thomsen | G06Q 10/0633 705/7.27 |

(Continued)

OTHER PUBLICATIONS

Screenshot of online PLC simulator (www.plcsimulator.net) as of Jul. 9, 2018.

(Continued)

*Primary Examiner* — Kyle O Logan
(74) *Attorney, Agent, or Firm* — Notre Dame Intellectual Property Clinic

(57) ABSTRACT

Integrated software systems and methods that can control the design, emulation, testing and production activities of a conveyor based system. In embodiments, the control system implements an object-oriented like environment into a PLC (Programmable Logic Controller) system and uses its software to define and control the operation of the PLC dynamically from a computer. In other embodiments, a hot backup method allows the conveyor system to continue to function on failure of one or more PLCs.

15 Claims, 9 Drawing Sheets

(56) References Cited

U.S. PATENT DOCUMENTS

| | | | |
|---|---|---|---|
| 2015/0242548 A1* | 8/2015 | Jones | G06F 17/5022 |
| | | | 703/21 |
| 2018/0127217 A1* | 5/2018 | Henze | B65G 43/10 |
| 2018/0203438 A1* | 7/2018 | Henze | G05B 19/4184 |

OTHER PUBLICATIONS

Screenshot of PLC Training Simulator (www.thelearningpit.com/plc/psim/psim.html) as of Jul. 9, 2018.

* cited by examiner

INTEGRATED CONTROL SYSTEMS AND METHODS

CROSS REFERENCE TO RELATED APPLICATIONS

This application claims priority from U.S. Provisional Application No. 62/433,399, entitled "Integrated Control System", and filed Dec. 13, 2016. The disclosure of which is hereby incorporated in its entirety by reference thereto.

BACKGROUND

Conveyor systems are used to transport materials or packages. They are widespread and used across a variety of industries, including but not limited to, mining, food processing, bottling and packing industries. A number of computer software packages assist in the design of conveyor systems, however, none provide a comprehensive and integrated approach to the entire process. The control of conveyors, motors and sensors is normally performed via PLC (Programmable Logic Controllers), special electronic computer defined for the control of such devices. The programming languages used for the PLCs (ladder logic, structured text, etc.) are relatively primitive, compared to Windows and Unix based object oriented programming languages such as Java, C++ and Microsoft .NET environments. The primitive programming environment does provide benefits in terms of simplicity and reliability, but increasingly, users want more integration between the operations of the conveyor devices and the back end computer systems. Additionally, because the primitive language required for the PLC is not intuitive, a skilled and experienced programmer or software engineer is required to configure or make any subsequent changes to the PLCs or the conveyors, motors, sensors, etc. controlled by the PLCs. As a result, it is expensive, inefficient and time-consuming to install or update a conveyor system.

BRIEF SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

The described apparatuses and methods relate to the field of conveyor system controls. In embodiments, a control system for a conveyor system, comprising: a data store that maintains configuration data that describes a configuration of the conveyor system; and a design component configured to enable a user to design a layout and the configuration for the conveyor system, wherein the configuration data includes one or more devices and relationships between the one or more devices. In other embodiments, the control system further comprises a test component that includes a PLC emulator configured to run PLC logic; wherein the test component uses the configuration data to assess the configuration of the conveyor system. In another embodiment, the control system also comprises a SCADA component configured to transmit the configuration data to one or more PLCs in the conveyor system, and control the conveyor system; wherein the one or more PLCs are encoded with the PLC logic of the PLC emulator. In addition, the control system can include a graphical interface component configured to provide a graphical schematic of the conveyor system to a user.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The systems, devices and methods may be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

DETAILED DESCRIPTION

Aspects of the system and methods are described below with reference to illustrative embodiments. The references to illustrative embodiments below are not made to limit the scope of the claimed subject matter. Instead, illustrative embodiments are used to aid in the description of various aspects of the systems and methods. The description, made by way of example and reference to illustrative reference is not meant to being limiting as regards any aspect of the claimed subject matter.

Figure 1:
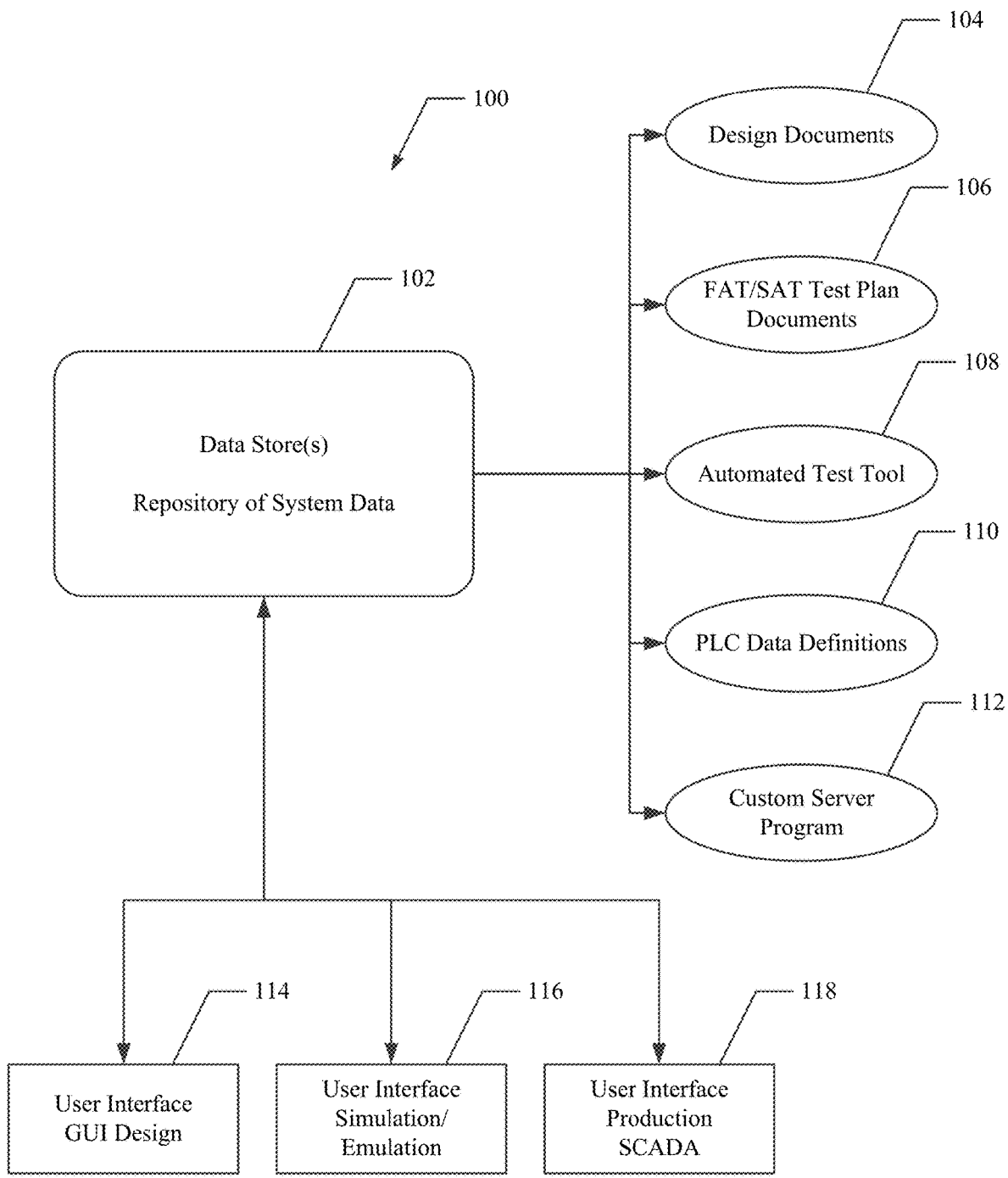
FIG. 1 depicts a block diagram of an embodiment of a control system that provides for design, test and operation of a conveyor system.
Figure 2:
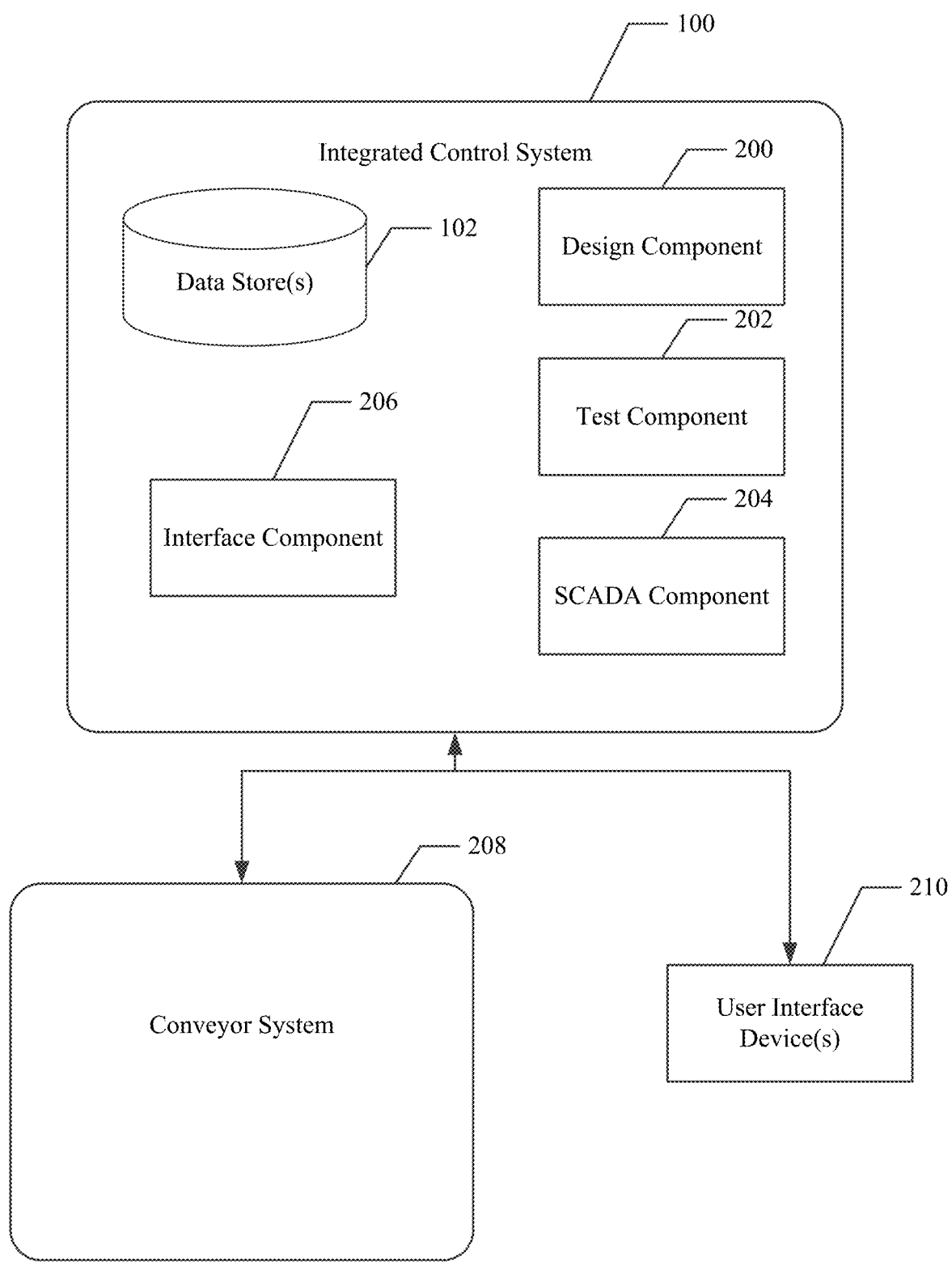
FIG. 2 depicts a block diagram of another embodiment of a control system.
Figure 3:
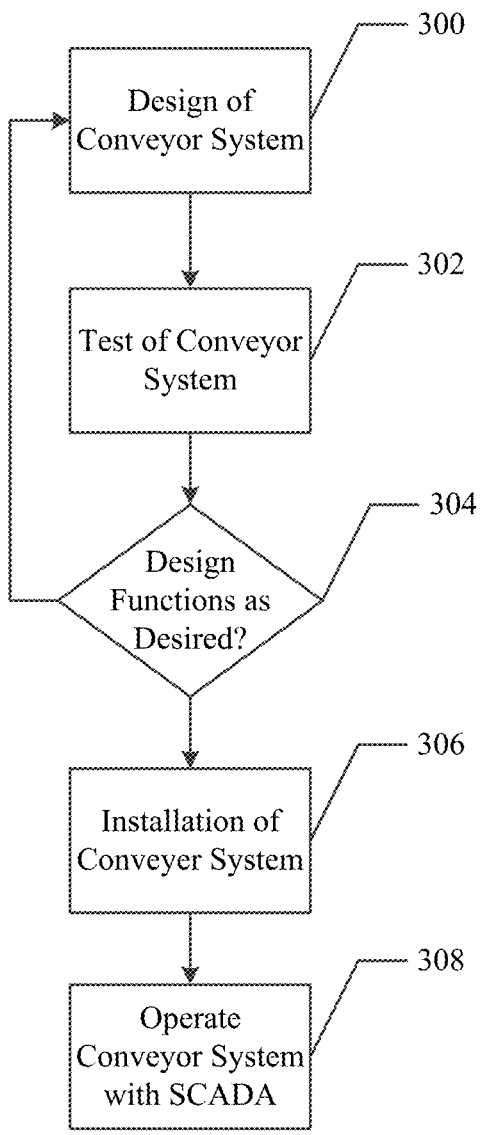
FIG. 3 depicts a flowchart of an embodiment of an integrated control process.

Referring to FIGS. 1-3, an integrated control system 100 and process for design, test and operation of a conveyor system is shown. In an embodiment, an integrated development environment, including a graphical user interface (GUI), allows a user to design, test and implement a complete conveyor system. Embodiments of the described control system 100 effectively implement an object-oriented environment on one or more PLCs and provides an integrated solution to control a conveyor system. In embodiments, PLC code is standardized, such that a single set of PLC code can control multiple conveyor systems with varying configurations. The specific instructions for the particular configuration can be downloaded from the control system 100 to the PLC as configuration data, which the standardized PLC code is able to interpret to operate the particular conveyor system. Specific instructions for a particular factory are provided as data to the standardized PLC, where the standardized PLC is encoded with the control logic capable of interpreting this data. Therefore, a change to the configuration of the conveyor system can be managed by downloading new configuration data reflecting the configuration change, but does not require recoding the logic of the standardized PLC itself.

Turning again to FIG. 1, in an embodiment, the control system 100 includes one or more data stores 102 (e.g., a relational database) that store information related to one or more conveyor system configurations. For example, the data store 102 can maintain information regarding or related to conveyor system equipment, including but not limited to, conveyors, photoeyes, control stations, energy zones, merges, diverts, bar code readers, horns, security/fire doors, alarm lights, emergency stops, manual inspection locations, load measurement, label printers, cart loaders and other devices. In embodiments, this configuration information effectively defines a particular conveyor system configuration. The illustrated control system 100 can utilize the configuration data maintained in the data store 102 to produce a set of documents for the conveyor system 208, including, but not limited to, design documents 104 used during planning and construction of a conveyor system 208, a factory acceptance test (FAT) plan 106 used to test the conveyor system 208 and its components, as well as a site acceptance test (SAT) plan 106 used to test the conveyor system 208 after complete installation and configuration. In addition, the control system 100 can utilize the information in the data store 102 to create an automated test tool 108 that is capable of testing the conveyor system 208 as installed. The control system 100 can also utilize the data to create the PLC data definitions 110 downloaded to the conveyor system PLCs, where the PLCs are encoded with the standardized PLC code. As discussed, once the configuration data, also referred to as the PLC data definitions 110, is downloaded, the PLCs are capable of controlling the conveyor system 208 described by the configuration data. In other embodiments, the control system 100 can generate a custom server program 112, which can integrate into a user's legacy conveyor system computer programs.

In embodiments, one or more GUIs are provided for interfacing with the control system 100 and allowing one or more users to design, test and/or implement a conveyor system 208. As illustrated, the control system 100 can include a GUI design user interface 114 that assists a user in designing a conveyor system 114, the interface 114 including a GUI design environment. In other embodiments, the control system 100 provides a test or simulation/emulation user interface 116 for simulation of the conveyor system 208 or emulation of the PLC code and testing of the conveyor system 208. This test user interface 116 can be configured to enable users to test the conveyor system 208 and PLC code without requiring encoding of PLCs or assembling the conveyor system 208. In addition, the control system 100 can provide a SCADA user interface 118 for production and supervisory control and data acquisition (SCADA). In embodiments, the control system 100 can provide a single interface or combination of interfaces that allow the user to design, test, implement and control the resulting conveyor system 208 through a single tool, namely the integrated control system 100.

Turning now to FIG. 2, a block diagram of an embodiment of an integrated control system 100 is illustrated. As shown, the control system 100 includes one or more data stores 102 that maintain conveyor system configuration data. As illustrated, the control system 100 can also include a design component 200, a test component 202, a SCADA component 204, as well as an interface component 206 that allows a user to interact with the control system 100. Here, the design component 200 facilitates design of a conveyor system 208, assisting a user in visualizing and specifying a conveyor system 208. The configuration data for the resulting conveyor system 208 can be maintained in the data store 102. Once a user is satisfied, the design component 200 can produce a set of design documents 104.

The test component 202 provides users with the ability to simulate the conveyor system design defined by the design component 200. The integrated control system 100 includes an internet browser based PLC environment or operating system, such that PLC code can be executed in a browser environment for testing and debugging. In embodiments, simulation includes emulation of PLC code without requiring actual encoding of a PLC. This emulation reduces time and expense in encoding individual PLCs. Instead, the user can test use conditions, failures and operations on a simulation of the conveyor system 208. The rich test environment allows the user to identify issues and potential problems with the conveyor system 208 before the parts are ordered and the conveyor system 208 assembled. In addition, the SCADA component 204 allows the user to monitor and control the conveyor system 208 through the familiar interface of the control system 100. As shown, the user can interact with the control system 100 through a user interface device 210 such as a personal computer, laptop, mobile device, or other type of computing hardware.

FIG. 3 is a flowchart depicting one common method of conveyor system design and implementation using an embodiment of the control system 100. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

At step 300, a configuration for the conveyor system 208 is developed or designed using the design component 200. As described in more detail below in FIG. 4, the control system 100 can provide a GUI allowing a user to visualize the conveyor system 208. Upon completion of design, the control system 100 will provide configuration data for one or more conveyor systems 208, where the configuration data can be used during the test phase at step 302. In the test phase, the test component 202 simulates operation of the conveyor system 208, allowing the user to simulate various conditions, including but not limited to, variations in speed of operation and failure of equipment. In embodiments, the GUI provides a model of the conveyor system 208 in operation, allowing a user to easily identify potential problems. If the configuration of the conveyor system 208 passes the test plans at step 304, the process continues to implementation of the conveyor system 208 at step 306. However, if problems are identified during the testing, the user can return to the design phase 300 of the conveyor system 208.

An iterative process of design and testing can be accomplished before installing the actual conveyor system 208 using the control system 100.

Upon successful completion of testing, the conveyor system 208 is installed or updated at step 306. The control system 100 can be used to monitor and control operation of the conveyor system 208 at step 308. In this embodiment, the control system 100 provides a single, consistent interface throughout the lifecycle of the conveyor system 208.

Figure 4:
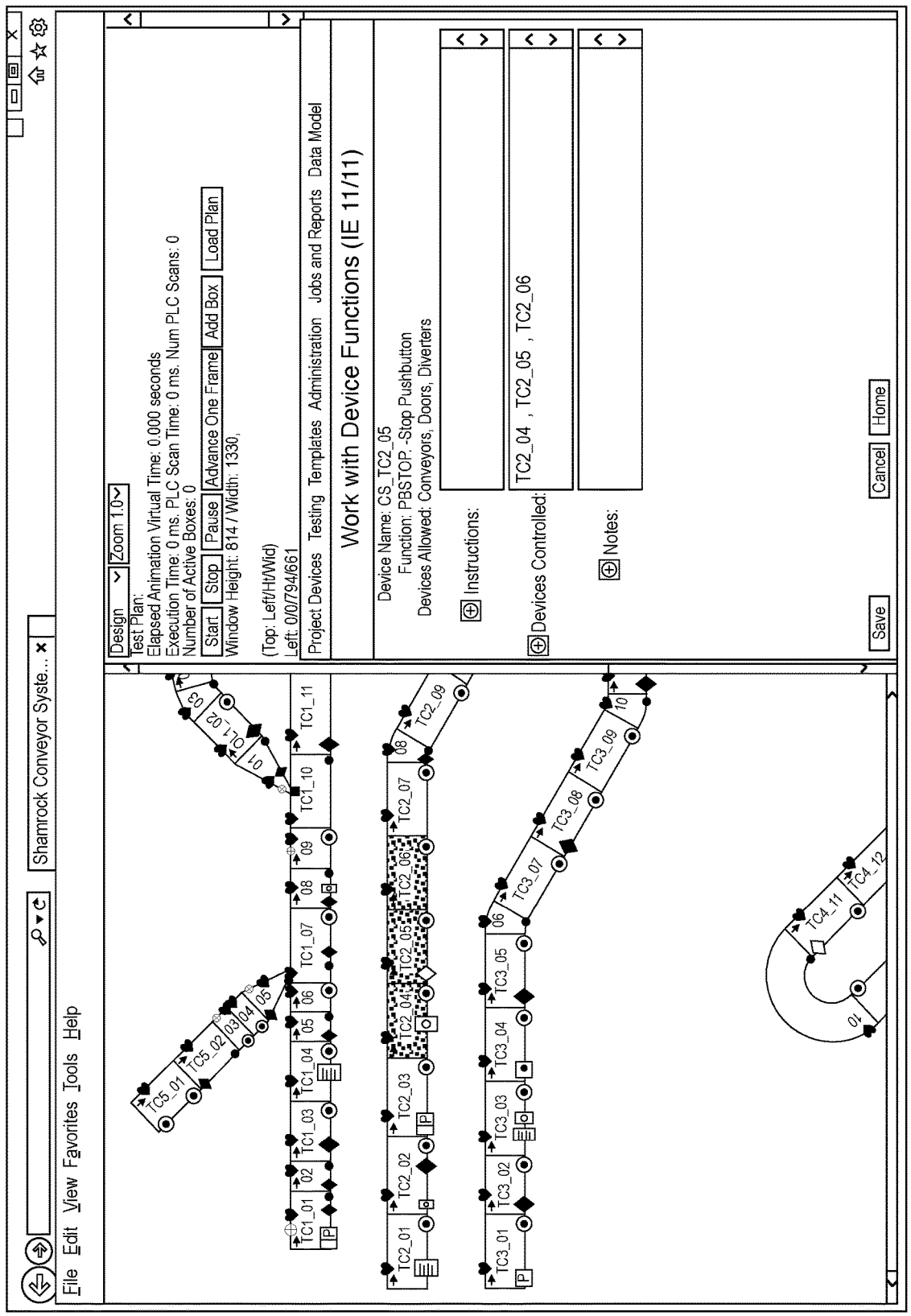
FIG. 4 depicts an embodiment of a GUI for design of a conveyor system in an embodiment the control system.

Turning now to FIG. 4, an embodiment of a GUI for the design component 200 of the control system 100 is shown. Embodiments of the control system 100 include a GUI and the creation of a set of web-based graphical user interface screens that allow the user to define the characteristic data elements of the conveyors, the related devices, and the relationships between said conveyors and devices in a conveyor system 208. The control system 100 creates a graphical schematic of the conveyor system devices, based on the length and width of each conveyor, and based on the location of the related devices. This visual feedback assists the user in creating a coherent design and provides quick feedback to the user. For example, a simple typo doubling the desired length of a conveyor would be easy to spot in the graphical schematic, and much more difficult to identify in a simple text table or text description. The graphical schematic also enables a user to view merges, diverts and devices. System interactions, including but not limited to, jams, control station functions, and the like, can be defined graphically using the GUI. In the screenshot depicted in FIG. 4, the user is able to define the conveyors that will stop when the Stop Pushbutton on Control Station CS_TC2_05 is pressed, by selecting the graphical representations of the conveyors TC2_04, TC2_05, and TC2_06.

Figure 5A:
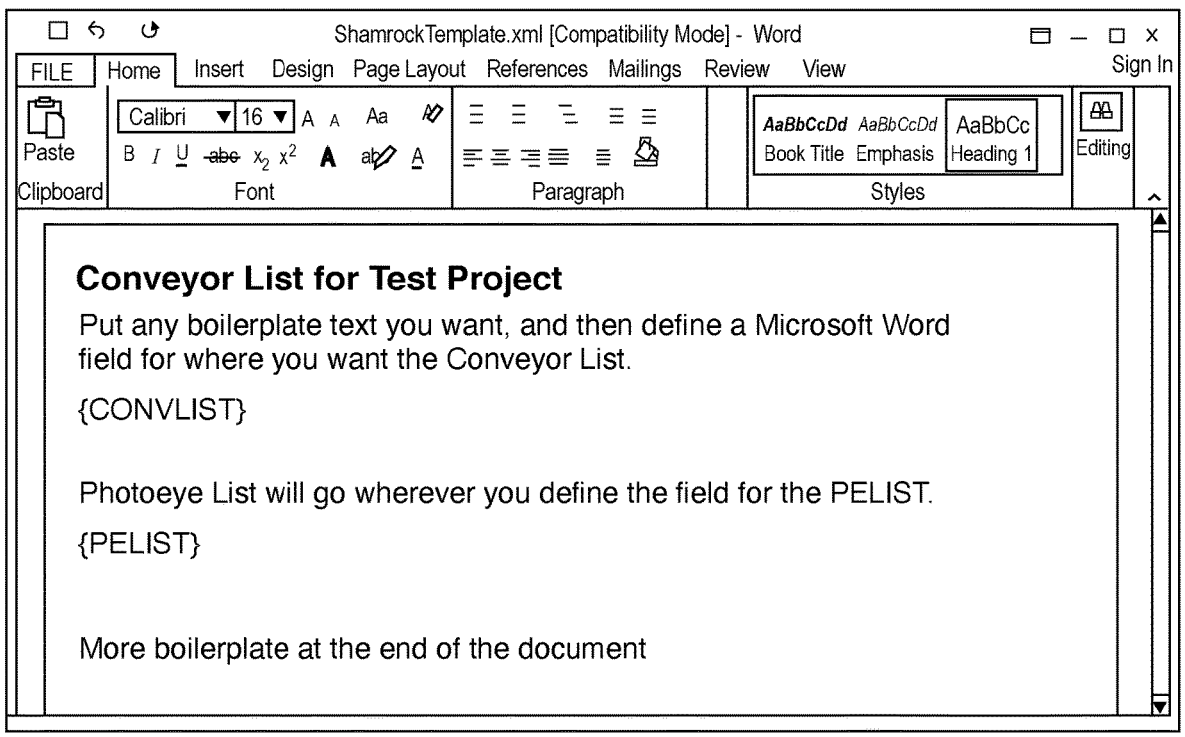
FIG. 5A depicts an example word document used in an embodiment of design document creation.
Figure 5B:
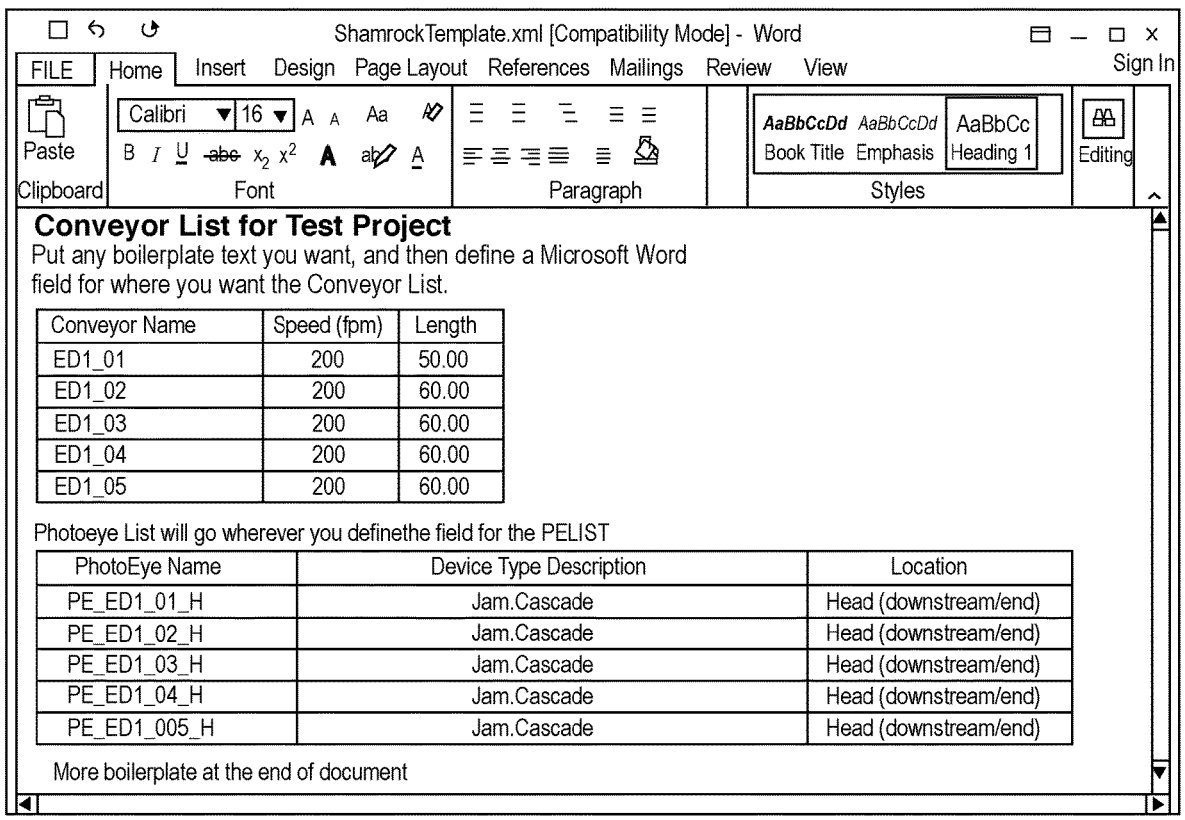
FIG. 5B depicts an example word document created in an embodiment of design document creation.

Turning to FIGS. 5A and 5B, in embodiments, the design component 200 of the control system 100 is capable of generating design documents 104 for conveyor system configurations created using the control system 100. Typically, a systems integrator is required to provide design documents 104 (e.g., Word documents or PDFs) to a customer in a specific format. Embodiments of the control system 100 enables a user to create a template in the desired document format (e.g., Microsoft Word) using specific keywords. An exemplary template is shown in FIG. 5A. The control system 100 will then read the template, and substitute data from the data store(s) 102 for the keywords, as shown in FIG. 5B. This provides an easy way to create required systems design documentation 104 that matches the configuration data of the data store(s) 102 with a minimum of expended effort. In addition, use of configuration data from the data store 102 ensures the accuracy of the design documentation 104 since it is drawn from the source. In the example shown in FIGS. 5A and 5B, the user utilizes tags {CONVLIST} and {PELIST} to insert a table with the conveyor list and photoeye list, respectively.

Figure 6:
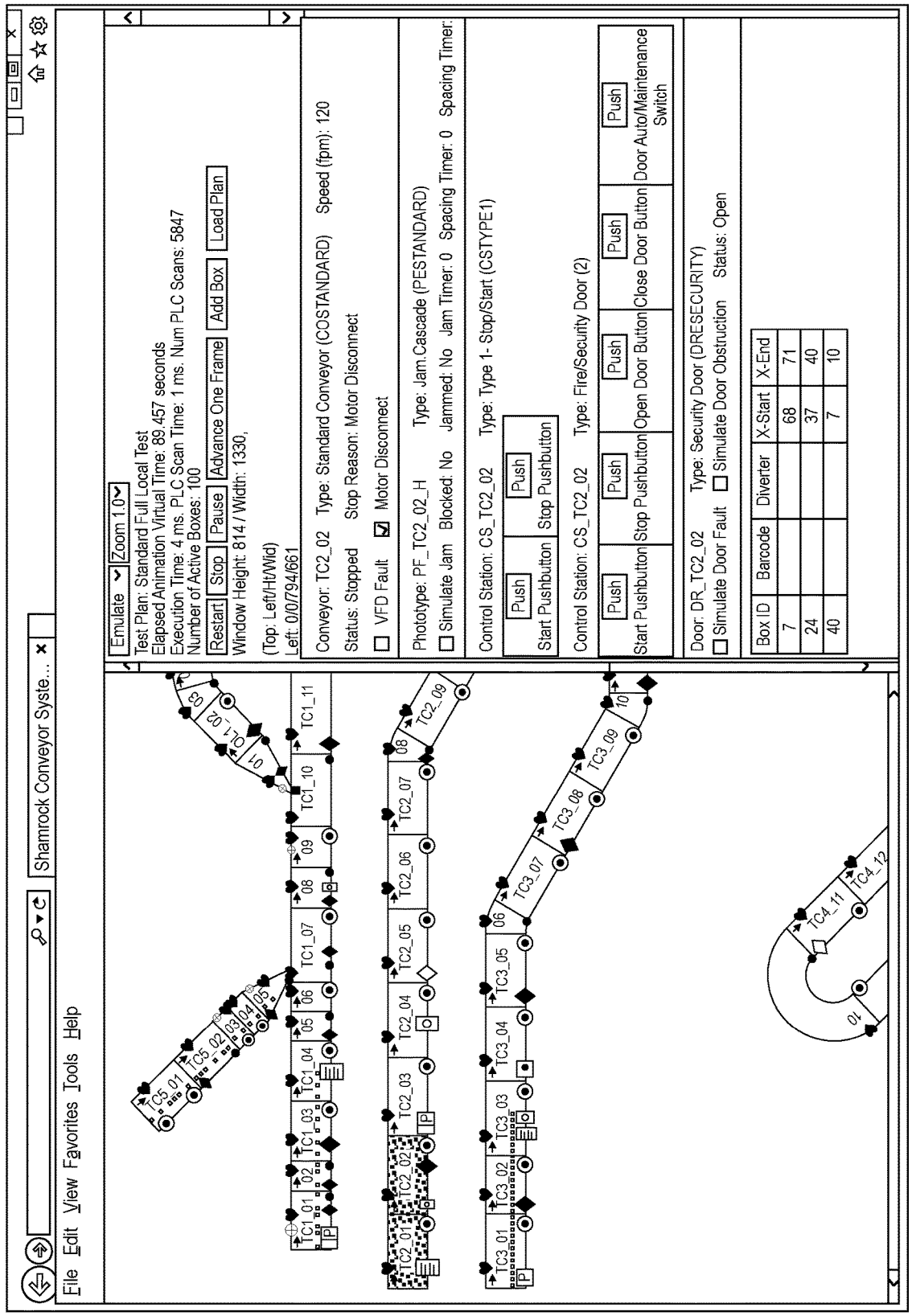
FIG. 6 depicts an embodiment of a GUI for testing of a conveyor system in an embodiment the control system.

FIG. 6 depicts an embodiment of a GUI for testing of a conveyor system 208. In embodiments, the test component 202 is capable of simulation and emulation of a conveyor system 208, enabling a user to evaluate the conveyor system 208 without requiring installation of the system or even encoding of PLCs. In embodiments, the interface 116 provides a graphical schematic of the conveyor system 208 and shows boxes or items moving through the conveyor system 208. The user can control the number of boxes, simulate faults, and control station interactions. In an embodiment, the test component 202 emulates PLC code in the component or on a GUI, such as a web-based browser, rather than requiring coding of a PLC. This speeds the testing process and allows for complete testing before installation. In other embodiments, multiple users can emulate and test, simultaneously and independently. The visual feedback in the user interface 116 allows users and conveyor system purchasers to see a representation of the conveyor system 208 and its operation at the time the system is proposed, rather than at factory acceptance testing.

Embodiments of the control system 100 provide the ability to test/emulate the conveyor system 208 using a test component 202 including a PLC emulator running within a Javascript set of code on a web browser. The PLC emulator provides an emulated PLC environment on the internet browser platform, effectively providing a PLC operating system that allows a developer to write code, test and debug on a standard computer. This can enable the developer to work collaboratively with a remote customer using the internet, all before the purchase, installation and configuration of a PLC. The resulting code is then copied to the PLC.

In the illustrated interface shown in FIG. 6, packages visually move through the conveyors on the graphical user interface. Users can visually see the conveyor system outputs (e.g., Photoeye sensor outputs, horns and lights, doors opening/open/closed, etc.) and control inputs (e.g., the pressing of a Control Station button, simulating a motor fault, motor disconnect, etc.) to verify that the conveyor system requirements have been correctly defined and that the conveyor system 208 will operate as intended. This provides an innovative and valuable feature that allows the user to visualize a working conveyor system 208 in a web browser environment before any PLC code has been written. The PLC emulator allows the users to quickly see the conveyor system 208 working in an emulation mode. Users can simply redefine the system 208 through the configuration data, rather than coding the PLCs. In the test depicted in FIG. 6, boxes are moving through the conveyor system 208. Here, a Motor Disconnect is simulated on Conveyor TC2_02, putting TC2_01 into a Cascade stop mode.

Figure 7:
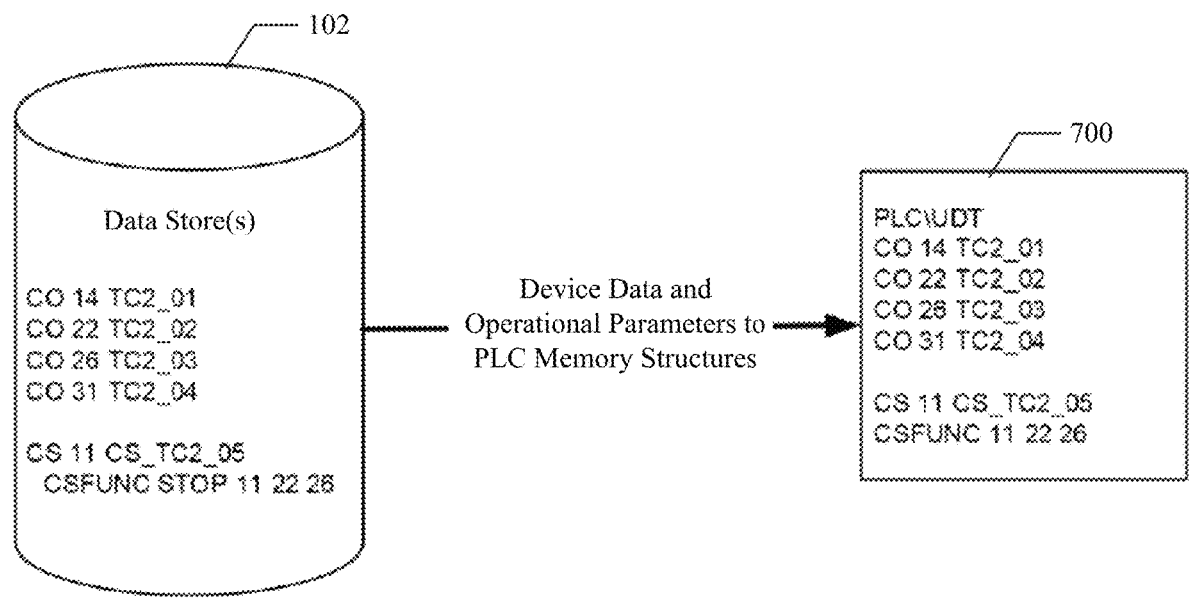
FIG. 7 depicts an embodiment of PLC encoding using data to dynamically push instructions to the PLC.

Referring now to FIG. 7, embodiments of the control system 100 can use a data driven system of PLC encoding, where the PLC logic code is standardized and the conveyor system configuration is downloaded to the PLC 700 as data. Most current approaches require coding of logic routines for each PLC 700, specific to the devices and requirements of that conveyor system 208. In contrast, the data-driven method of PLC encoding allows updating of configuration information without requiring recoding of the PLC logic. Instead of relying on specific logic code that reference devices for an implementation, these data-driven programming routines will reference the configuration data downloaded into a user define data type (UDT) data structures, which will provide all the information needed to control the conveyor system 208.

As shown in FIG. 7, the data store(s) 102 includes conveyor system information, such as the conveyor devices, control stations, photoeyes, and the like. This configuration data, which defines the conveyor system 208, is downloaded to PLC memory structures. In an embodiment, a UDT stores the conveyor system data, including but not limited to, defined conveyors, related devices, and the relationships among them. The standardized logic code on the PLC 700 is able to interpret information from that UDT.

In embodiments, the same configuration data that was created during design or used during the testing and simulation is then downloaded to the PLC UDT memory locations. Procedural logic in the PLC 700 loops through the UDT data, assessing inputs and setting outputs. The same standardized, procedural PLC logic code can work for multiple conveyor system installations. The distinction between installations is not the logic code that runs on the PLC 700, but rather the UDT data that is downloaded to the PLC 700. Essentially, this method brings an almost object-oriented programming environment to the PLC development environment. Pre-tested PLC logic routines can be used from one conveyor system 208 to the next. This reuse of code speeds up development time dramatically, improves quality of the code and speed up testing as well, as identical or similar routines can be used across multiple conveyor systems 208.

Figure 8:
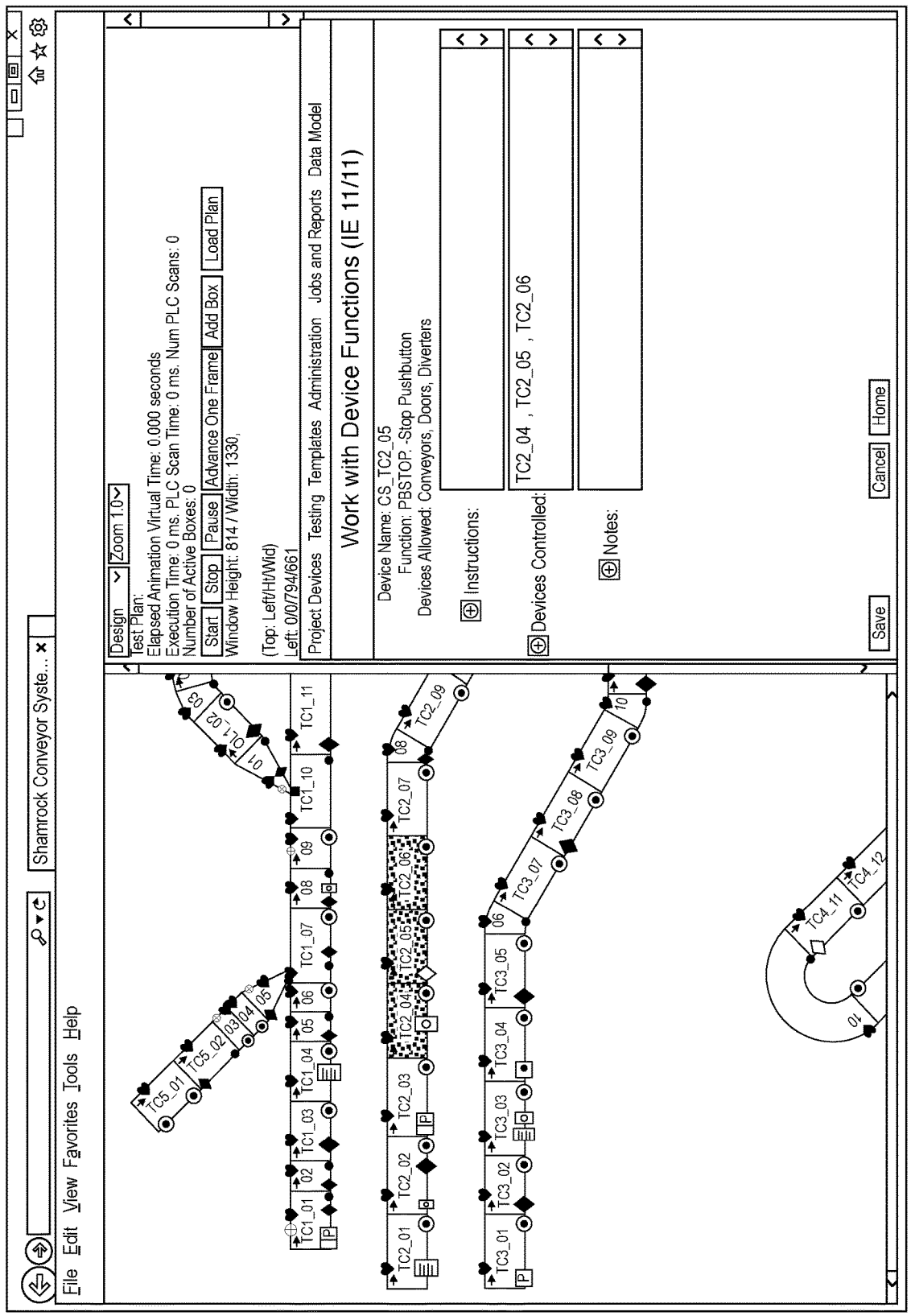
FIG. 8 depicts an embodiment of a GUI for SCADA of a conveyor system in an embodiment the control system.

Referring to FIG. 8, an embodiment of a SCADA GUI 118 of a conveyor system 208 in an embodiment the control system 100 is shown. Embodiments of the control system 100 include the transmission of diagnostic and operations data from the PLC to the control system 100. In embodiments, in SCADA mode, a web based graphical user interface 118 can provide the same graphical schematic of the conveyors. As depicted, each conveyor has a background color or effect representing its current state (e.g. Running, Stopped, Error, Cascade, etc.). Alarm information with details about any conveyor stoppage can be provided to the control system 100. Current approaches require the implementation of a separate SCADA system with implementation-specific routines to communicate this information from the PLC to the SCADA system. In certain embodiments, the control system's object oriented like environment provides these features with no implementation specific coding.

If an identical or similar GUI is used during design and SCADA mode, the user will more quickly become comfortable with the control system 100. In embodiments, design, test, and SCADA mode can be implemented with a single tool, reducing implementation costs and time. Access to SCADA mode via a browser makes it simple for multiple users to access the controls, and the illustrated graphical schematic makes it easy for a user to understand the current state of the conveyor system 208 at a glance. For example, the depicted GUI shows that TC3_03, TC3_04 and TC3_05 conveyors are stopped merely by their color. An operator could detect this error in the conveyor system operation at a glance.

Figure 9:
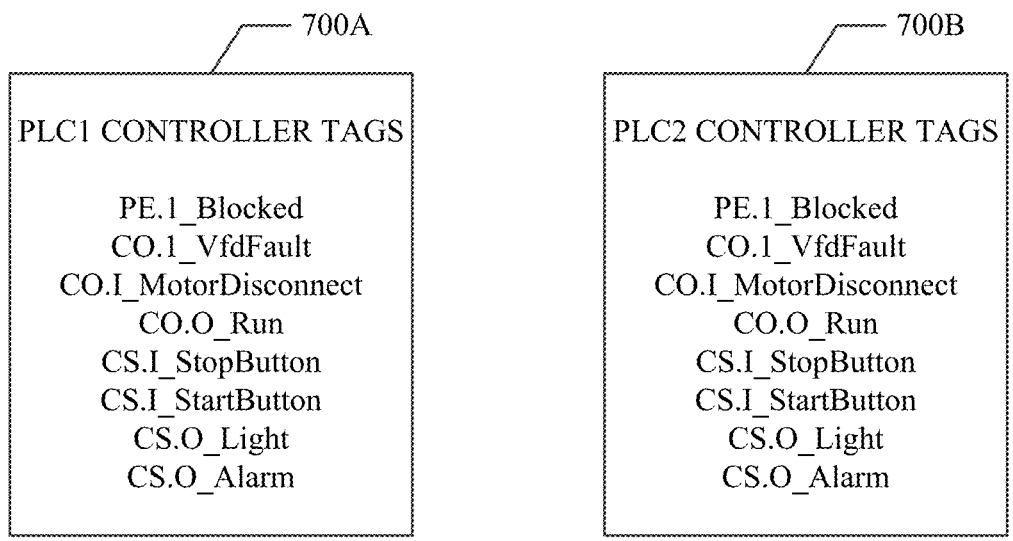
FIG. 9 depicts an embodiment of a hot backup process in an embodiment of the control system.
Figure 9:
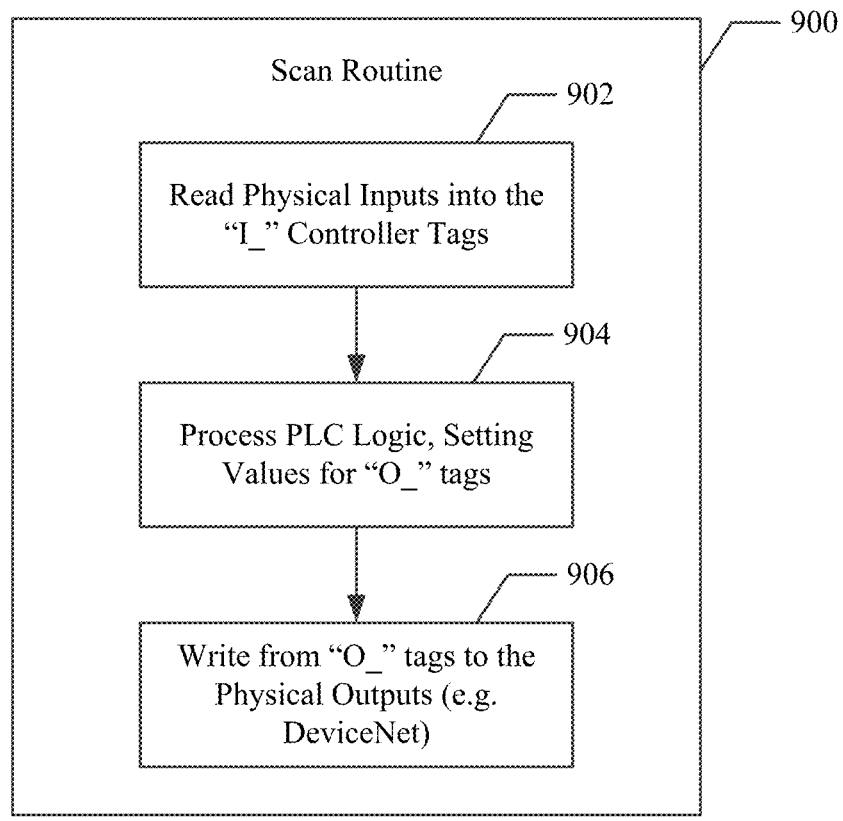

Referring to FIG. 9, an embodiment of a hot backup process in an embodiment of the control system 100 is shown. As used herein, "hot backup" means that the conveyor system 208 is able to continue to operate and perform during failure and recovery of at least one PLC 700 in a multi-PLC conveyor system 208. Embodiments of the control system 100 include the implementation of a special architecture that provides for PLC hot backup so that the conveyor system 208 can provide continuous uninterrupted operations in the case of a PLC 700 failure, with no special hardware required. The standardized PLC logic code uses procedural language code and the UDT discussed above to loop through the device definitions of the systems operations (e.g., conveyor, photoeye, control station definitions). As shown in FIG. 9, during the scan routine 900, physical inputs, the signals from devices in the conveyor system 208 received from the device network, e.g. DeviceNet, are read into the "I_" controller tags (input tags) at step 902, and the PLC logic is processed and values are set for the "O_" tags (output tags) at step 904. A "PLC tag" is a computer memory storage element—a "variable". Finally, the "O_" tags are written to the physical outputs, where signals are transmitted to the conveyor system devices via the device network (e.g., DeviceNet) at step 906.

In this embodiment of hot backup, each PLC 700A,700B is responsible for setting the outputs for a set of conveyors.

For example, PLC1 700A is responsible for conveyors 1 to 100 (and its associated photoeyes, control stations, etc.) and PLC2 700B is responsible for conveyors 101 to 200. Both PLCs 700A,B read from the device network, referred to as DeviceNet, inputs and fill the "I_" tags (input tags) for all conveyors 1-200. Both PLCs 700A,B execute the PLC logic code and set the "O_" tags (output tags) for all conveyors 1-200. However, each PLC 700A,B sets the physical outputs only for its assigned conveyors, 1 to 100 or 101 to 200, for PLC1 700A and PLC2 700B, respectively. Each PLC 700A,B continually sends a heartbeat signal to the other PLC 700A,B and to the computer server.

In the instance of an outage for PLC2 700B, PLC1 700A recognizes that the heartbeat signal from PLC2 700B is lost. PLC1 700A then determines that is covering for PLC2 700B, and PLC1 700A now sets the physical outputs for the PLC2 devices, as well as the PLC1 devices. Since PLC1 700A has been continuously executing the same logic, it will have all the tracking data needed to seamlessly continue operations. When the heartbeat from PLC2 700B is recovered, any necessary data is transferred from PLC1 700A to PLC2 700B and then PLC2 700B resumes control of the physical outputs for its devices, conveyors 101 to 200. Similarly, PLC1 700A resumes to setting the physical outputs for conveyors 1 to 100 only.

Within a multi-PLC environment, each PLC can have one (or more) PLCs designated as its backup. To act as a backup, each PLC can be sized to do the work of 2 PLCs, but this allows for hot backup with no special hardware required. The backup assignments can be made via a simple configuration setting.

As user herein, the terms "component" and "system" are intended to refer to either hardware, a combination of hardware and software, firmware, or software. A component can be localized within a single computer or distributed between one or more servers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:
1. A control system for a conveyor system, comprising:
   a data store that maintains configuration data that describes a configuration of the conveyor system;

a design component configured to enable a user to design a layout and the configuration for the conveyor system, wherein the configuration data includes one or more devices of the conveyor system and relationships between the one or more devices; and a test component that includes a PLC emulator configured to run standardized PLC logic capable of interpreting the configuration data to emulate one or more PLCs in the conveyor system, wherein the one or more PLCs in the conveyor system are encoded with the standardized PLC logic and the configuration data is downloaded to the one or more PLCs in the conveyor system to operate the conveyor system.

2. The control system of claim 1, further comprising:
a SCADA component configured to transmit the configuration data to the one or more PLCs in the conveyor system, and control the conveyor system, wherein the one or more PLCs are encoded with the PLC logic of the PLC emulator.

3. The control system of claim 1, further comprising:
a graphical interface component configured to provide a graphical schematic of the conveyor system to a user.

4. The control system of claim 1, where standardized PLC logic for one or more PLCs in the conveyor system is capable of interpreting and operating with configuration data for multiple configurations of the conveyor system.

5. The control system of claim 1, wherein the configuration data is stored in a user defined data type (UDT) data structure and downloaded to the one or more PLCs in the conveyor system, and wherein the standardized PLC logic is a procedural logic that interprets the UDT to control the conveyor system.

6. The control system of claim 1, wherein the design component generates a design document based upon the configuration data.

7. The control system of claim 1, where in each of the one or more PLCs in the conveyor system has a backup designated in such a manner that the backup PLC is capable of performing operations in case of failure of the one or more PLCs in the conveyor system, until the failed PLC is operational.

8. An integrated control system for design and test of a conveyor system, comprising:
a design component configured to generate configuration data that defines the conveyor system, wherein the configuration data and is downloaded to memory structures in one or more PLCs of the conveyor system and the one or more PLCs are encoded with a procedural PLC logic configured to read the configuration data from the memory structures to operate the conveyor system;

a test component that emulates the one or more PLCs of the conveyor system based upon the configuration data and the procedural PLC logic; and an interface component that facilitates user visualization and design of the conveyor system.

9. The integrated control system of claim 8, further comprising a SCADA component configured to allow a user to monitor and control the conveyor system in operation.

10. The integrated control system of claim 8, wherein the test component simulates speed of operation and equipment failure conditions of the conveyor system.

11. The integrated control system of claim 8, further comprising a graphical user interface configured to provide a graphical schematic of the conveyor system.

12. The integrated control system of claim 8, wherein the design component is configured to generate a design document for the conveyor system based at least in part upon a template and the configuration data.

13. A method for design, test and control of a conveyor system, comprising:
creating design data using an integrated design and test system, wherein the design data defines a conveyor system configuration;

testing the conveyor system configuration using a PLC emulator of the integrated design and test system, the PLC emulator is encoded with PLC logic and interprets the design data; and implementing the conveyor system by downloading the design data to conveyor system PLCs, wherein the conveyor system PLCs are encoded with the PLC logic capable of operating for multiple configurations and utilizing the design data for the conveyor system configuration.

14. The method of claim 13, further comprising operating the conveyor system utilizing a SCADA GUI of the control system communicating with the conveyor system PLCs.

15. The method of claim 13, further comprising generating a design document based at least in part up on the design data and a document template.

* * * * *